Jan. 1, 1935.    D. H. BOWLZER    1,986,248
BEVERAGE DISPENSER
Filed Oct. 1, 1931
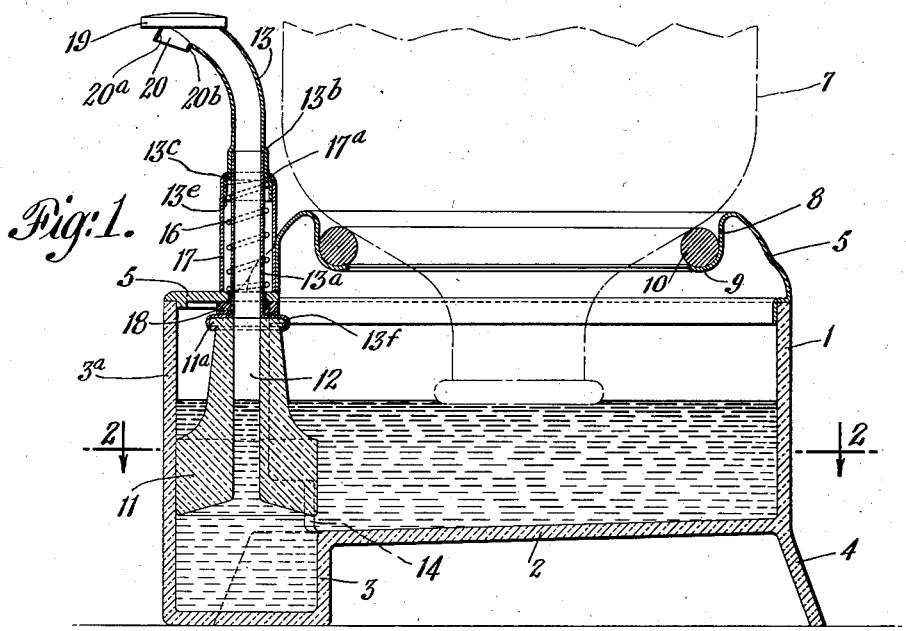
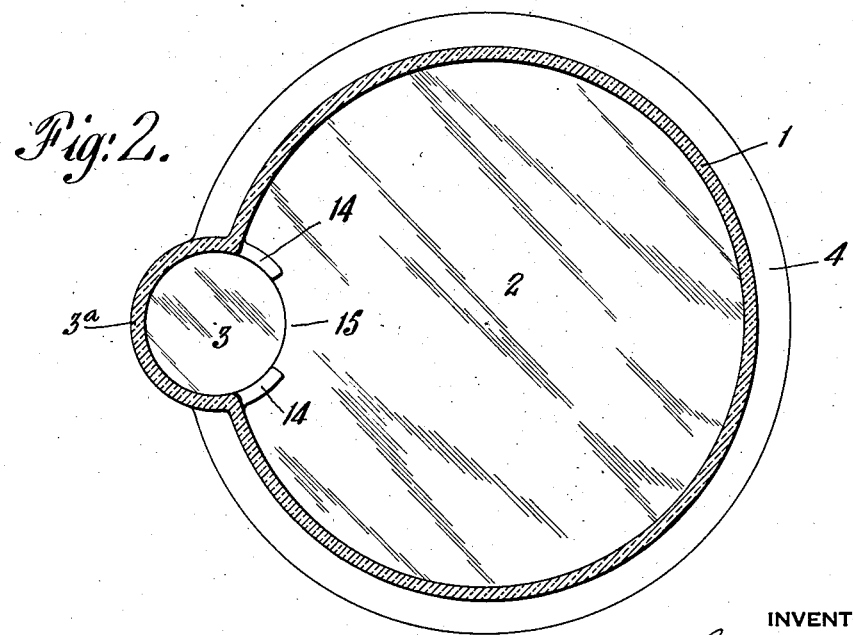
INVENTOR
Daniel H. Bowlzer
BY
his ATTORNEY Patented Jan. 1, 1935

1,986,248

UNITED STATES PATENT OFFICE 1,986,248

BEVERAGE DISPENSER

Daniel H. Bowlzer, Cleveland, Ohio, assignor to Cordley & Hayes, New York, N. Y., a corporation of New York Application October 1, 1931, Serial No. 566,245

3 Claims. (Cl. 225—35)

This invention relates to fluid dispensers, particularly such as are adapted to measure and deliver a definite quantity of a concentrated syrup, fruit juice or the like, of the kind commonly supplied at soda fountains and diluted to make a beverage.

In dispensing such liquids it is highly desirable that the exact quantity required be measured and delivered rapidly with a minimum of effort and thought on the part of the attendant, and the principal object of the invention hence resides in the provision of devices which accomplish these results in a superior manner and which at the same time are simple and inexpensive to manufacture, efficient in operation and durable in service.

Other objects and advantages of the invention will appear as the description proceeds. It will be clear that the construction is useful in connection with liquids other than those mentioned, though it is especially suited to such as are rather viscous or thick, as compared, say, to water.

A preferred embodiment of my invention will now be described with reference to the accompanying drawing wherein: Fig. 1 is a vertical cross-section through the middle of a dispenser, in accordance with the invention, and Fig. 2 is a section on line 2—2 of Fig. 1 looking in the direction of the arrows, the plunger which does the dispensing, however, having been removed.

I have found that a dispenser of the character indicated is advantageously constructed by making the container for the liquid and a sump for cooperation with a plunger, in a single unit, and by providing a cover for this unit, the plunger and means for conveying liquid to a point outside the container, being combined and carried with the cover but being capable of movement with respect thereto. For example, there is shown a container having a side wall 1 which may be circular, but extends through less than a complete circle, to leave an opening at one side. The container is preferably made of some material such as is adapted to be in contact with the liquid without imparting to it any bitter or other undesirable taste. This container has a bottom 2, and a well or sump 3, preferably circular and partly set-off at the front of the container and below its bottom, so that a part of the sump is within the circular cross-section of the container proper, while the balance of the sump is outside this area, for purposes which will be apparent. The outer wall of the sump 3 is continued upwardly above the bottom of the container as at 3a, to complete the side wall 1 which it joins. Extending downwardly and outwardly from the container bottom at its perimeter is a flange 4 for supporting the container in a horizontal position. A cover 5 has shouldered portions for engaging the upper rim of the container, and is preferably adapted to support an inverted bottle 7 for supplying liquid to the container. For this purpose, the cover has a central opening which is also conveniently circular, and is shown formed with a downwardly extending portion 8, the end of which is turned inwardly as at 9, and curved to form a convenient seat for ring 10 of cushioning material for supporting the bottle. This ring may be cemented to the portions 9, or held thereon in any other known manner.

The size of the sump 3 will be determined by the amount of liquid which is to be furnished on each stroke of the plunger 11, which is adapted to fit slidingly in the sump. When this plunger is caused to descend from the position shown, it will, upon coming adjacent the bottom of the container, close the entrance to the sump and accordingly confine a quantity of the liquid therein. As the plunger continues to descend it will displace the fluid from the sump and cause it to rise through the central opening 12 in the plunger and thence through tube 13 to a desired point outside the container. As it is not desirable for the plunger to abut directly against the bottom of the sump when one or both are made of glass, the construction is preferably such that the end 13e of the tube 13 abuts against the cover to limit the downward travel of the plunger. In order to provide for the use of a single container and sump for measuring different amounts of liquid, the sump may advantageously be formed deep enough below the bottom of the container to receive the largest quantity to be measured, while smaller amounts can be dispensed simply by adjusting the stroke of the plunger. For guiding the plunger when it is above the container bottom, flanges 14 extend thereabove as continuations of wall 3a and have an opening 15 between them to allow fluid in the container to enter the sump. The bottom of the container preferably slopes slightly toward the sump. In this way, the device is operative even though there is only a small depth of liquid in the container, while at the same time the plunger is maintained in alignment with the sump.

Through the combination of the inverted bottle, container and sump construction, the dispensing of an accurately measured quantity of fluid is insured upon each stroke of the plunger because the level of the liquid in the container and normally standing within the plunger is constant due to the seal at the mouth of the bottle so that the amount of liquid segregated or confined by the plunger as it enters the sump is always the same. As the amount segregated is constant the amount dispensed is precisely controlled.

The tube 13 is advantageously constructed so that it serves not only as a delivery passage for the liquid, but also as a means for operating the plunger, and is carried with the cover 5, extending therethrough for limited upward and downward movement relative thereto, the cover acting as a guide for the tube. For convenient assembly of the construction, the tube 13 is formed with shoulders 13b for engaging the end of tube 13a which, as shown, is separate from but forms a continuation of tube 13. For structural reasons the tubes are preferably of metal. The lower end of tube 13a is shown crimped, as at 13f, over a circular flange 11a formed on the top of the plunger. If desired the tube 13a may be formed integral with the plunger, as an extension thereof.

For maintaining the plunger normally in elevated position, there is provided a coil spring 16 which seats against the top of cover 5 and surrounds the tube 13a. The upper end of the springs seats against a shoulder 13c which may be formed at the base of a flange at the end of the tube 13. For limiting the upward action of the spring and for enclosing it, a cylindrical housing 17 is secured to the cover 5 in any suitable manner and provided at its upper end with inturned flanges 17a which are adapted to engage shoulders 13c. For cushioning the plunger at the end of its upward travel a ring 18 of elastic material may be interposed betwen the top of the plunger and the cover 5, and secured to either of these elements. In this construction, the stops 17a are really not necessary.

To assist in depressing the plunger, the top of tube 13 may be cut off and a flat plate 19 secured there across thus providing a surface against which the attendant may place his hand and push downward.

I have provided a particularly desirable delivery opening at the top of the tube, for preventing drip of the liquid after the desired quantity has been ejected. This is constructed by bending the tube 13 into a goose-neck, or toward the horizontal, but not so much so that the lower wall of the tube is horizontal. In other words, the lower wall of the tube is inclined from its very end toward the vertical portion of the tube. The lower wall terminates below plate 19 which also serves as the top of the tube, extending the upper wall. Between the plate and the lower wall there is secured a short tubular element 20 which has a portion 20a to deflect the liquid in a downward direction, and a portion 20b which need only be sufficient to permit it to be secured to the lower side of tube 13. This construction has been found to be particularly desirable because it prevents drip, which is especially apt to occur with sugary liquids. Moreover, it provides for delivery of the syrup, or other liquid, in a direction somewhat outward from the device, so that the glass or drinking cup into which the fluid is to be delivered need not be held close to or against the device, thus reducing the care required of the attendant and practically eliminating the chipping or breaking of glasses.

In manufacturing the device, the whole container, including the sump and the supporting flange may advantageously be formed as an integral piece of cast glass, while the cover may be bakelite, or similar material, and I prefer this construction not only for sanitary reasons but also because of pleasing appearance and relatively low cost. The plunger 11 is also preferably formed of glass. As the metal tube, extends but to the top of the plunger, which is normally adjacent the cover, the liquid is in contact only with glass except for the short time during which it passes through the tube. However, while the advantages of my invention are increased by this particular construction, other materials may, of course, be employed.

It will be appreciated that while I have shown a construction which is particularly suitable for use in connection with an inverted bottle, the device is also capable of embodiment by simple modifications, as an open top dispenser.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a device of the character described, a container for liquid, a sump below the bottom of the container and normally in free communication therewith for receiving liquid therefrom, a plunger adapted to enter the sump to displace the liquid therefrom, and means to maintain the plunger normally above the sump, a portion of the wall of the container being constructed to aid in guiding the plunger when it is above the sump.

2. A liquid dispenser including a container for liquid, a top for the container adapted to support an inverted bottle, a sump adapted to receive liquid from the container and normally in free communication therewith, means normally above the sump adapted to enter the sump to confine and positively displace a quantity of liquid, and a tube carried with said means for conveying displaced liquid to a point outside the container, said tube extending through said top, being supported thereby and having sliding engagement therewith, the top with said tube being freely removable as a unit, said sump having an open upper end and integral guide means thereon for retaining and guiding said confining means when the top is applied to the container.

3. In a device of the character described a generally vertical tube for conveying liquid to a point of discharge, the upper end of said tube being curved outwardly to provide a downwardly and outwardly facing discharge opening at one side of said tube, the portion of the tube wall at said side having its highest point closely adjacent to the edge of said opening, said portion and the rim of said opening forming a sharp bend at said highest point, and an integral extension of the remaining portion of the tube wall having a flat surface for manual engagement and being extended over said opening to deflect the liquid downwardly and outwardly.

DANIEL H. BOWLZER.